United States Patent
Clow et al.

[15] 3,674,690
[45] July 4, 1972

[54] AIR DRYING SILICONE RESIN BONDED DRY FILM LUBRICANT

[72] Inventors: William L. Clow, Fairborn; Robert J. Benzing, Xenia; Bobby D. McConnell, Dayton, all of Ohio

[73] Assignee: The United States of America as represented by the Secretary of the Air Force

[22] Filed: July 8, 1969

[21] Appl. No.: 840,022

[52] U.S. Cl. .............................................. 252/25, 252/49.6
[51] Int. Cl. .................................. C10m 7/50, C10m 7/06
[58] Field of Search ........................................... 252/25, 49.6

[56] References Cited

UNITED STATES PATENTS

| | | | |
|---|---|---|---|
| 2,703,768 | 3/1955 | Hall | 252/25 |
| 3,364,161 | 1/1968 | Nadler | 252/25 |
| 3,247,281 | 4/1966 | Gagliardi | 252/25 |
| 3,525,691 | 8/1970 | McConnell | 252/25 |
| 3,223,626 | 12/1965 | Murphy et al. | 252/25 |
| 3,288,710 | 11/1966 | Hollitz | 252/25 |

*Primary Examiner*—Daniel E. Wyman
*Assistant Examiner*—I. Vaughn
*Attorney*—Harry A. Herbert and Alvin B. Peterson

[57] ABSTRACT

The process described herein comprises an air drying solid film lubricant and the process for the preparation thereof and for applying the same to substrate metals. The air drying solid film lubricant comprises a binder and a lubricant, which binder consists essentially of a siloxane prepolymer having at least 10 repeating units of the formula

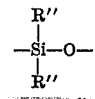

mixed in an inert solvent with an aminoalkyl-silane having the formula

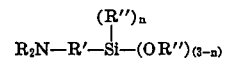

and the lubricant consisting essentially of a mixture of molybdenum sulfide ($MoS_2$) and antimony oxide ($Sb_2O_3$), wherein R is hydrogen, alkyl, cycloalkyl or aminoalkyl of no more than ten carbon atoms;

R' is a divalent hydrocarbon radical having at least three carbon atoms and having the valence bonds which are attached to the N and Si of the formula separated by at least three carbon atoms;

R" is a monovalent hydrocarbon radical having one to six carbon atoms; and n is an integer having a value of 0–2;

said aminoalkyl-silane being used in a proportion of 3–25 parts per 100 parts of said siloxane prepolymer; said solvent being used in a proportion to give 20–40 parts solvent per part of binder; said molybdenum sulfide and antimony oxide per part of molybdenum sulfide; and said mixture being used in the range of from 30 volumes of lubricant mixture per 70 volumes of binder up to 85 volumes of lubricant per 15 volumes of binder, preferably 50–85 volumes of lubricant per 100 volumes of lubricant-binder mixture.

Other solid lubricant mixtures which may be used include replacement of the molybdenum sulfide by molybdenum diselenide, tungsten disulfide, tungsten diselenide and the like, and/or replacement of the antimony trioxide by zinc oxide (ZnO) or bismuth oxide ($Bi_2O_3$) and the like.

24 Claims, No Drawings

AIR DRYING SILICONE RESIN BONDED DRY FILM LUBRICANT

The invention described herein may be manufactured and used by or for the United States Government for governmental purposes without payment to us of any royalty thereon.

BACKGROUND OF THE INVENTION

1. Field Of The Invention

The present invention relates to a method of preparing a dry solid film lubricant which can be air dried without the addition of organic modifiers or the application of heat which in addition to providing the desired lubrication is capable of withstanding high temperatures for extended periods.

The invention also relates to the dry solid film lubricant composition prepared thereby.

2. Description Of The Prior Art

Unmodified siloxane resins have long been recognized for their thermal stability and resistance to high temperatures. For that reason, they have been used as protective films or coatings in a variety of applications. When modified with various organic resins, the siloxane resins perform satisfactorily up to 650°F. for only short periods of time. However, extended exposure to this temperature destroys the organic portion of the coating, and results in film failures. Therefore, such modifications are usually limited to about 450°F. to avoid peeling and blistering. Unmodified polysiloxane bonded solid lubricants have withstood high temperatures but have required high temperatures (exceeding 450°F.) for curing.

Air curing solid film lubricants have also been employed which are based on the acrylic type resin systems. These materials can be applied and cured in air at room temperatures. They are limited, however, to a useful temperature of about 300°F. in solid film lubricant compositions. Resin systems such as phenolic or epoxy types on the other hand can meet the higher temperature requirements as solid lubricant binders but cannot be air cured at ambient temperatures. Other than the polysiloxane systems there has been no approach to an air cured high temperature resistant solid film lubricant.

The achievement of supersonic speeds by aircraft and space vehicles and the aerodynamic heating, as high as 650°F. and higher, resulting from friction of these vehicles passing through the atmosphere have created a demand for an air curable polysiloxane solid lubricant capable of withstanding high temperature. The need for the air curing stems from the need for application of such solid film lubricants as replacements in the field where facilities are not available for heat curing materials. For example, the curing time of all presently known unmodified polysiloxane films is approximately 30 minutes at 480°F. while other high temperature resin systems also require comparable elevated temperatures and curing times.

While this time-temperature combination can be varied, by shortening the time and increasing the temperature, or vice versa, heat curing facilities are nevertheless required in all such cases. However, hot air ovens for field application to components of aircraft or space vehicles are impractical. For these reasons, unmodified siloxane coatings for such purposes have not been considered feasible in spite of the well-known thermal stability capabilities of these materials.

In some attempts to solve the difficulties, resort has been made to modifying the polysiloxanes with substantial proportions of organic resins, such as alkyd resins. Such modified polysiloxane resins can be relatively easily applied to large objects and air-dried to provide durable and adherent coatings. While such modified coatings have been satisfactory in many instances, and can be made to achieve many desirable characteristics, they are not capable of the prolonged heat resistance or thermal stability shown by the "pure" or unmodified polysiloxane film.

No prior art has been found as to the method of preparing, applying and air drying lubricating polysiloxane resins as a solid film lubricant capable of withstanding the temperatures of 600°F. or more.

Keil U.S. Pat. No. 3,249,535 discloses the preparation of copolymer prepared by the reaction of a polymeric dimethylsiloxane having hydroxy terminal groups with an organic acid derivative of an aminoalkyl-siloxane monomer. Although the reaction is indicated as proceeding at room temperature or upon heating, the presence of the acid component apparently prevents polymerization from proceeding to a cured state, since the product is indicated as being soluble in diesel fuel. The resultant solution is fed into oil lines to prevent paraffin deposition. Reference is also made to coating the oil conduit or container with this material. There is no indication in this patent that a material was obtained which was capable of being air-dried or cured to a solid film lubricant capable of withstanding high temperatures as described above, or of providing lubricating properties as desired for reducing the friction and wear.

Other prior art references show the use of amino-alkyl silanes as catalysts to promote the polymerization of monomer silanes, such as hydrolyzed dimethyldichlorosilane or diphynyldichlorosilane, methyltrichlorosilane, phenyltrichlorosilane, and the like, such as described in Sellers' U.S. Pat. No. 3,068,199. However, in these cases, the amino compound acts as a catalyst in promoting the reaction of the monomeric siloxane. The types of products obtained are not indicated as being suitable for solid film lubricants with lubricating properties that would cure at room temperature to give cured insoluble lubricating coatings capable of withstanding high temperatures and providing reduced friction and wear.

Morehouse et al. U.S. Pat. No. 3,085,908 shows the preparation of copolymers of gamma-aminopropylsilicone and phenylsilicone, and like materials. However these are not shown to be capable of air drying as protective lubricant coatings as produce cured solid film lubricants capable of withstanding high temperatures and providing lubricating properties. In this particular case, the aminoalkyl-silicones are copolymerized with the other silicones.

The air-drying binder portion of the present composition is disclosed and claimed in the co-pending application of Robert L. Stout, Ser. No. 802 249, filed 25 Feb. 1969. However, this co-pending application makes no disclosure as to the lubricating portions of the present composition.

SUMMARY OF THE INVENTION

In accordance with the present invention, a polysiloxane solid film lubricant coating cured by air drying to a film having the lubricating and heat resistant properties indicated above is prepared by the process of admixing 0.4–6 volumes of a lubricating mixture per volume of binder, wherein the lubricant mixture consists essentially of 0.33–2 parts by weight of antimony oxide ($Sb_2O_3$) per part by weight of molybdenum sulfide ($MoS_2$) and said binder consists essentially of 3–25 parts by weight of an amino-silane compound having the formula

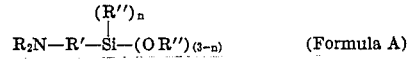

(Formula A)

with 100 parts of a polysiloxane prepolymer having at least ten repeating units therein of the formula

(Formula B)

in which formulas

R is hydrogen, alkyl, cycloalkyl or aminoalkyl of no more than 10 carbon atoms;

R' is a divalent hydrocarbon radical having at least three carbon atoms and having the valence bonds which are attached to the N and Si of the formula separated by at least three carbon atoms;

R" is a monovalent hydrocarbon radical having one to six carbon atoms; and n is an integer having a value of 0–2. Preferably the polysiloxane has no more than about 60 repeating units of the given formula, and still particularly preferred is a polysiloxane having terminal hydroxy groups and a molecular weight such as to give a viscosity at 25°C. of 80–275 centipoises when dissolved in toluene or xylene in a concentration of 50–60 60 percent solids. Particularly preferred are polymethylphenylsiloxane having a viscosity of 100–200 centipoises at 25°C. in xylene solution of 50 percent by weight, and polymethylphenylsiloxane having a viscosity of 175–275 centipoises at 25°C. in toluene solution of 60 percent by weight.

Particularly preferred as the polysiloxane is one in which one R" group represents methyl and the other represents phenyl. Particularly preferred as the amino-silane compounds are gamma-aminopropyltriethoxy-silane and delta-aminobutylmethyldiethoxysilane.

The solid lubricant film compositions of this invention may be modified by replacement of the molybdenum disulfide by molybdenum diselenide, tungsten diselenide, tungsten disulfide and the like, and/or replacement of the antimony trioxide by zinc oxide (ZnO) or bismuth trioxide ($Bi_2O_3$) and the like.

The components described above are mixed in an inert solvent, such as xylene or toluene, preferably in a proportion as to produce a solution having approximately 50 percent by weight solids. Then the components are allowed to react in solution for a minimum period of 10 minutes before the solution is applied as a coating on a solid substrate. Agitation of the solution during the mixing and during the coating process is preferred to ensure homogeneity. The uncured mixture may be stored for at least 90 days provided storage is in a closed air tight container. The nature of the substrate is not critical and can be steel, titanium, nickel base alloys or any other metal which can withstand the conditions to which the coating is to be subsequently subjected. Upon air drying and curing the applied film at a temperature of about 20°–40° C., a cured, insoluble coating is obtained capable of withstanding temperatures of 600°F. for extended periods.

Typical R groups that can be used in the above-described components include methyl, ethyl, propyl, amyl, hexyl, octyl, cyclohexyl, cyclohexylmethyl, cycloheptyl, methyl cyclohexyl, aminoethyl, aminopropyl, dimethylaminoethyl, diethylaminopropyl, etc.

Typical R' groups that can be used in the above formulas include the following divalent hydrocarbon radicals: trimethylene, 2,4-hexylene, n-amylene, octamethylene, p-phenylene, 1,4-cyclohexylene, methylene-p-phenylene, 4,4'-diphenylene, and the like. Advantageously the R and R' groups have no more than 12 carbon atoms, preferably no more than six.

Typical monovalent hydrocarbon radicals represented by R" include: methyl, ethyl, propyl, butyl, amyl, hexyl, phenyl, cycloheptyl, cyclohexyl, allyl, butenyl, pentenyl, hexenyl, vinyl, propargyl, etc.

In addition to xylene and toluene, various other hydrocarbons and chlorinated hydrocarbons can be used as the reaction and solvent media for producing the protective coatings of this invention. Such other solvents include benzene, cyclohexane, cycloheptane, hexane, octane, chlorobenzene, chlorotoluene, and the like.

In addition to $MoS_2$ and $Sb_2O_3$ the solid lubricant film compositions of the invention may be modified by replacement of the molybdenum disulfide by molybdenum diselenide, tungsten disulfide, tungsten diselenide and the like, and/or replacement of the antimony trioxide by zinc oxide (ZnO) or bismuth trioxide ($Bi_2O_3$) and the like. The proportions of such materials are those normally used as lubricants in solid film lubricant compositions. Preferably, however, no more than 6 parts of lubricant are used per part of total resin component.

The proportions of aminosilane to be used will vary according to the properties desired in the coating composition. When it is desired to accelerate the drying time, higher proportions of the aminosilane can be used. However, the use of more than 25 parts of the aminosilane appears to give no added benefit, but instead increases the raw material costs. On the other hand, if less than 3 parts by weight of the aminosilane is used, the drying period becomes more prolonged so that at least 3 parts and preferably at least 10 parts of aminosilane are used per 100 parts of the polysiloxane.

The lubricant component can vary from 0.33 parts by weight to 2 parts by weight of antimony oxide per part by weight of molybdenum sulfide, preferably 0.5–2 parts by weight antimony oxide per part by weight of molybdenum sulfide, and the volume ratio of lubricant to binder can vary from 0.4–6 volumes of lubricant per volume of binder, preferably 1–6 volumes of lubricant per volume of binder. The suitability of the lubricant composition is tested by a standard Falex test in which the wear-life is determined in minutes. The compositions to be tested are sprayed on the Falex specimens, then dried in a dessicator at room temperature for about 3 days and then tested at 1,000 lb. load, 290 rpm and ambient temperature.

The specimens for the Falex test consist of a one fourth-inch diameter pin which rotates between two V-blocks. Both the pin and V-blocks are coated with the solid film lubricant, giving four pressure points on the film. The pins are preferably made of AISI 3135 steel hardened to Rockwell B of 85 to 90. The V-block material is AISI 1137 steel hardened to a Rockwell C of 20 to 24. However, the pin and V-blocks may also be made from other alloys such as titanium. The test consists of placing the coated pin and V-blocks into the tester in proper position. Pin rotation is started before applying any load. Loading consists of running at 300 pounds for 3 minutes, 500 pounds for 1 minute, 750 pounds for 1 minute, and then at 1000 pounds until failure. Film failure is sensed by an increase in frictional torque of 5 inch pounds above the steady state value (usually 2–5 in.lb.). A solid film lubricant is not considered acceptable in this test unless the wear-life is at least 60 minutes.

| Falex Test Results (Wear-Life in Minutes) Lubricant-Binder Volume Ratio 1:0.33 | $MoS_2$:$Sb_2O_3$ Weight Ratio | | |
|---|---|---|---|
| | 1:0.5 | 1:1 | 1:2 |
| 1:1 | 76.7(68)* | | |
| 1.2:1 | 73.4(12) | | |
| 1.5:1 | 52.9(8) | 249.2(4) | |
| 2.3:1 | 95.9(24) | | |
| | 127.7(4) | 251.1(8) | 158.5(4) |
| 3:1 | | 267.6(4) | |
| 4:1 | 76.4(4) | 237.8(15) | 237.8(15) |
| 5.66:1 | | 261.7(4) | |

Conditions: Load — 1000 lb.; Speed — 290 rpm; Ambient Temperature.

*Number in ( ) indicates number of tests to determine average.

In preparing film composition for application, the aminosilane is added first to the inert solvent, followed by the polymethylphenysiloxane, or equivalent material, both in the desired proportions, and then a mixture of the molybdenum sulfide and antimony oxide previously mixed in the desired proportion as dry powders. The mixture is blended in a high speed-high shear mixer with mixing at each stage of material addition. After all the components have been added, the blender is run for approximately 1 minute at high shear rate to insure complete mixing and breaking up of any agglomerate particles of solid lubricant.

In addition to application by spraying, the prepared mixture or slurry may be brushed, dipped or in any other way applied to the substrate so as to form a coherent and uniform film on the substrate. A thin, uniform coating of approximately 0.0002 to 0.0005 inches in thickness is desired for best results.

The specimens are allowed to air dry, preferably in a dry, dust-free environment such as in a dessicator. Sufficient curing at room temperature is generally achieved after a period of approximately 75 hours. Curing can be accelerated by heating. For example, at 480°F. for 30 minutes will cure the coating as thoroughly as the 75-hour room temperature cure. Heating the coating to 100°F. or above will remove the organic character of the coating, causing it to go to an inorganic silica.

The cured coatings are ready for testing to determine friction, wear and life at various environmental conditions. Modification of the composition, coating thickness, application procedure and/or curing procedure may be made to improve the lubrication performance under specific conditions.

Another test useful in determining the characteristics of the products is the rub shoe tester operated at a load of 100 lbs. and a speed of 400 rpm in air. In a number of typical tests performed on lubricant films of this invention, the wear-life (load cycle) is found to be in the range of 109,884 to 165,436 at ambient temperature, and 202,148 to 266,664 at 400°F.

The rub shoe test specimens consist of a 1⅜-inch diameter steel disc coated with the solid lubricant film which rotates between two opposed and uncoated one fourth-inch wide steel rub shoes through which the load is applied. In this tester the speed, load, and temperature can be varied to obtain different test conditions. The tester is equipped with instrumentation to record frictional torque between the disc and rub shoes. Film failure is indicated by a change in frictional torque of three to five times the stabilized running torque. The test consists of the placing the coated disc on the tester shaft between the two opposed rub shoes. Shaft rotation is started with no load or very light load, and the load gradually applied by placing weights on a pan and lever system. The test is allowed to run to failure while recording friction and running time to failure. A solid film lubricant is considered acceptable in this test if it exhibits at least 50,000 load cycles under the above conditions.

The invention is best illustrated by the following examples. These examples are intended merely for illustrative purposes and are not intended to be regarded as limiting the scope of the invention or the manner in which it may be practiced. Unless specifically indicated otherwise, parts and percentages are by volume.

EXAMPLE I

One part of gamma-aminopropyltriethoxysilane is added to 540 parts of xylene in a flask equipped with a stirrer. To this is added 18 parts of a 50 percent xylene solution of polymethylphenylsiloxane having a viscosity in this solution of 150 centipoises at 25°C. This siloxane solution, containing 50 percent resin solids, has a light straw color, a specific gravity of 1.01, a Gardner color of 1, a Gardner-Holdt color of T-H, and weighs 8.4 pounds per gallon. The combined solutions are stirred until the components are thoroughly mixed and a mixture consisting of 3 parts by weight of molybdenum disulfide and 2 parts by weight of antimony trioxide are added in an amount that 70 volumes of the lubricant mixture is added per 30 volumes of the binder solids mixture. High speed stirring is continued until the various components are thoroughly mixed and then the solution is stirred at low speed for at least 10 minutes at room temperature. This solution is applied as a thin coating on Falex friction and wear specimens and allowed to air dry at room temperature. After 72 hours, the coating has cured to a tough, solvent-resistant and temperature-resistant film. Upon testing in the Falex test as described herein, this material is found to give films having an average wear-life of 266 minutes with a load of 1,000 lbs., at a speed of 290 rpm and at ambient temperatures.

EXAMPLE II

The procedure of Example I is repeated except that a mixture of equal parts by weight of molybdenum disulfide and antimony trioxide are added to the binder solution in an amount that 80 volumes of the lubricant mixture is added per 20 volumes of the binder solids mixture. Similar results are obtained with regard to air drying and hardening, and the product has similar properties with regard to heat resistance and lubrication performance.

EXAMPLE III

The procedure of Example I is repeated except that a mixture of 1 part by weight of molybdenum sulfide and 2 parts by weight of antimony trioxide are added to the binder solution in an amount that 70 volumes of the lubricant mixture is added per 30 volumes of the binder solids mixture. Similar results are obtained with regard to the air drying and hardening, and the product has similar properties with regard to heat resistance and lubrication performance.

EXAMPLE IV

The procedure of Example I is repeated except that a mixture of 3 parts by weight of molybdenum disulfide and 1 part by weight of antimony trioxide are added to the binder solution in an amount that equal volumes of the lubricant mixture and binder solids mixture are obtained. Similar results are obtained with regard to the air drying, hardening and heat resistance, and the product has approximately similar properties with regard to the lubrication performance.

EXAMPLE V

The procedure of Example IV is repeated except that the lubricant mixture is added to the binder solution in an amount that 80 volumes of the lubricant mixture is added per 20 volumes of the binder solids mixture. Similar results are obtained with regard to the air drying, hardening and heat resistance, and the product has approximately similar properties with regard to the lubrication performance.

EXAMPLE VI

The procedure of Example I is repeated using in place of the antimony trioxide in that example, an amount of bismuth trioxide such as to produce a mixture of equal parts by volume of molybdenum disulfide and bismuth trioxide. Similar results are obtained with regard to air drying, hardening and heat resistance, and the product has similar lubrication properties.

EXAMPLE VII

The procedure of Example VI is repeated using in place of bismuth trioxide of that example, an equivalent amount of zinc oxide. Similar results are obtained with regard to the air drying, hardening and heat resistance, and the product has approximately similar lubrication properties.

Similar results are obtained as in the preceding examples when other polysiloxanes having repeating units of Formula B are substituted for the polymethylphenylsiloxane such as polyethylphenylsiloxane, polymethylcyclohexylsiloxane, polymethylbutylsiloxane, polymethylethylsiloxane, polybutylphenylsiloxane, polydimethylsiloxane, polydiphenylsiloxane, polymethylhexylsiloxane, and the like.

Likewise other aminosilanes of Formula A, when substituted for the aminosilanes in the above examples, give similar results such as:
Aminopropyldiethylethoxysilane
Dimethylaminotriethoxysilane
Diethylaminodibutylphenoxysilane
Aminodipropylbutoxysilane
Ethylaminoethylaminobutyltributoxysilane
Aminophenylaminodibutylethoxysilane The solid film lubricants prepared according to the procedures described herein and illustrated by the foregoing examples can be exposed to temperatures as high as 700°F. for short periods and can withstand temperatures of 600°F. almost indefinitely. In addition the products of this invention have a number of other very desirable properties including good adhesion, good lubrication of titanium metal, and good endurance under low amplitude or fretting wear environments. For example, a product of Example II, in which $MoS_2$ and $Sb_2O_3$ were used, has operated for 12,000,000 cycles in a fretting condition when coated on a titanium surface.

Various metal substrates can be used provided they can withstand the conditions to which the solid film lubricant is to be exposed. The substrate is first cleaned of dirt, grease and any oxide layer. This can be effected by first solvent cleaning with conventional solvents. The coatings are advantageously applied by spray application, preferably to a film thickness of between 0.2 and 0.5 mil dry film thickness. While films of considerable thickness can be applied effectively, the film thickness, in order to obtain a fast rate of air drying and best wear life, generally does not exceed 1 mil. With a wet film thickness of 0.6 mil, the films are generally air-dried sufficiently in 5 minutes to be set to touch, dust free in 7 minutes and tack free in 60 minutes.

In some cases a surface pretreatment of conditioning may be used on the metal to be lubricated. This is normally done after cleaning the surface with a solvent.

Typical pretreatments would include phosphating of ferrous alloys, oxidation of nickel based alloys, anodizing of titanium surfaces and the like. Conditioning would involve dry grit blasting, liquid honing, and the like.

These materials are found to have excellent friction and wear properties even after exposure at 500°and 700°F. For example, coating of Example II in which the lubricant is $MoS_2$ and $Sb_2O_3$ gives wear lives of 244,180 load cycles at 500°F. and 8,046 load cycles at 700°F. when tested in the dual rub shoe test at 100 pound load and 400 rpm as described above.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The Invention Claimed Is:

1. A process of preparing a solid film lubricant composition having reduced friction properties and capable of withstanding high temperatures comprising the steps of:

a. mixing in an inert solvent a binder consisting essentially of an aminoalkyl-silane having the formula

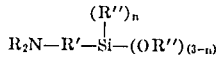

and a siloxane prepolymer having at least 10 repeating units of the formula

and a lubricant comprising a mixture of a component selected from the class consisting of molybdenum disulfide, molybdenum diselenide, tungsten disulfide and tungsten diselenide, and an oxide selected from the class consisting of antimony trioxide, zinc oxide and bismuth oxide, wherein R is selected from the group consisting of hydrogen, alkyl, cycloalkyl and aminoalkyl radicals having no more than 10 carbon atoms therein;

R' is a divalent hydrocarbon radical having at least three carbon atoms and having the valence bonds which are attached to the N and Si of the formula separated by at least three carbon atoms;

R'' is a monovalent hydrocarbon radical having one to six carbon atoms therein; and n is an integer having a value of 0–2;

said aminoalkyl-silane being used in a proportion of 3–25 parts per 100 parts of said siloxane prepolymer; said solvent being used in a proportion of 20–40 volumes of solvent per volume of binder; said lubricant mixture being added in a volume ratio of 0.4–6 volumes of lubricant mixture per volume of aminoalkylsilane-siloxane prepolymer mixture, and said lubricant mixture comprising 0.33–2 parts by weight of oxide per part by weight of said component b. allowing the resulting mixture to stand for at least 10 minutes;

c. applying a film of said mixture to a substrate; and d. air-drying said film at a temperature of 20°–40° C. for at least 72 hours.

2. The process of claim 1 in which said component is molybdenum disulfide and said oxide is antimony trioxide.

3. The process of claim 2 in which said lubricant-binder ratio is in the range of 1–6 volumes of lubricant per volume of binder.

4. The process of claim 3 in which said components of said lubricant mixture are used in the range of 0.5–2 parts by weight of antimony oxide per part by weight of molybdenum sulfide.

5. The process of claim 1 in which said siloxane prepolymer is polymethylphenylsiloxane.

6. The process of claim 4 in which said amino-silane is gamma-aminopropyltriethoxysilane.

7. The process of claim 5 in which said solvent is selected from the class of toluene, xylene and benzene and said polymethylphenylsiloxane has a viscosity of 100–200 centipoises at 25° C. in a xylene solution of 50 percent by weight.

8. The process of claim 5 in which said amino-silane is N-beta-aminopropyltriethoxysilane.

9. The process of claim 8 in which said solvent is selected from the class of toluene, xylene and benzene and said polymethylphenylsiloxane has a viscosity of 100–200 centipoises at 25° C. in a xylene solution of 50 percent by weight.

10. The process of claim 5 in which said amino-silane is delta-aminobutylmethyldiethoxysilane.

11. The process of claim 10 in which said solvent is selected from the class of toluene, xylene, and benzene and said polymethylphenylsiloxane has a viscosity of 100–200 centipoises at 25° C. in a xylene solution of 50 percent by weight.

12. The process of claim 5 in which said polymethylphenylsiloxane is one having a viscosity of 175–275 centipoises at 25° C. when measured in a toluene solution containing 60 parts by weight of said siloxane.

13. The process of claim 5 in which said polymethylphenylsiloxane has a viscosity of 100–200 centipoises at 25° C. in a 50 percent by weight solution in xylene, said amino-silane being selected from the class consisting of gamma-aminopropyltriethoxysilane, N-beta-aminoethyl-gamma-propyltrimethoxysilane, and delta-aminobutylmethyldiethoxysilane.

14. The process of claim 13 in which said amino-silane is used in a proportion of about 20 parts by weight per 100 parts of said polymethylphenylsiloxane.

15. The process of claim 5 in which said polymethylphenylsiloxane has a viscosity of 175–275 centipoises at 25° C. in a 60 percent by weight solution in toluene, said amino-silane being selected from the class consisting of gamma-aminopropyltriethoxysilane, N-beta-aminoethyl-gamma-propyltrimethoxysilane, and delta-aminobutylmethyldiethoxysilane.

16. The process of claim 14 in which said amino-silane is used in a portion of about 20 parts by weight per 100 parts of said polymethylphenylsiloxane.

17. The process of claim 1 in which said component is molybdenum disulfide.

18. The process of claim 1 in which said component is molybdenum diselenide.

19. The process of claim 1 in which said component is tungsten disulfide.

20. The process of claim 1 in which said component is tungsten diselenide.

21. The process of claim 1 in which said oxide is antimony trioxide.

22. The process of claim 1 in which said oxide is zinc oxide.

23. The process of claim 1 in which said oxide is bismuth trioxide.

24. A heat resistant lubricant film produced according to the process of claim 1.

* * * * *